United States Patent
Israelson

(10) Patent No.: US 7,621,987 B2
(45) Date of Patent: Nov. 24, 2009

(54) SELF REGENERATING DESULFURIZER FOR GASEOUS FUELS

(75) Inventor: Gordon A. Israelson, Murrysville, PA (US)

(73) Assignee: Siemens Energy, Inc., Orlando, FL (US)

( * ) Notice: Subject to any disclaimer, the term of this patent is extended or adjusted under 35 U.S.C. 154(b) by 490 days.

(21) Appl. No.: 11/403,638

(22) Filed: Apr. 13, 2006

(65) Prior Publication Data

US 2007/0253880 A1    Nov. 1, 2007

(51) Int. Cl.
 *B01D 53/14* (2006.01)
 *C10G 25/12* (2006.01)

(52) U.S. Cl. .................. 96/144; 422/168; 422/177; 423/244.01

(58) Field of Classification Search .............. 208/208 R; 585/820, 826; 96/143, 144; 422/177; 423/244.01
See application file for complete search history.

(56) References Cited

U.S. PATENT DOCUMENTS

| | | | |
|---|---|---|---|
| 5,492,684 A * | 2/1996 | Buchanan et al. ...... | 423/244.01 |
| 6,749,742 B2 * | 6/2004 | Franco et al. ............... | 208/245 |
| 6,828,141 B2 | 12/2004 | Kataoka | |
| 2003/0042646 A1 * | 3/2003 | Khare et al. ................. | 264/117 |
| 2005/0098478 A1 | 5/2005 | Gupta | |
| 2005/0145827 A1 | 7/2005 | McCabe | |

FOREIGN PATENT DOCUMENTS

| | | |
|---|---|---|
| EP | 1 121 977 A2 | 8/2001 |
| EP | 1 216 746 A2 | 6/2002 |
| EP | 1 577 369 A1 | 9/2005 |
| JP | 61-113689 | 5/1986 |
| RU | 2 159 663 C2 | 11/2000 |
| WO | WO 2004/058372 A2 | 7/2004 |
| WO | WO 2004/058927 * | 7/2004 |

OTHER PUBLICATIONS

Takashi Kyotani, Hiroyuki Kawashima, and Akira Tomita; "High-Temperature Desulfurizing Reaction with Cu-Containing Sorbents"; Environmental Science and Technology, American Chemical Society; Feb. 1, 1989; pp. 218-223; vol. 23, No. 2; XP000030214; ISSN: 0013-936X; Easton, PA, US.

* cited by examiner

*Primary Examiner*—Walter D Griffin
*Assistant Examiner*—Renee Robinson

(57) ABSTRACT

In one embodiment the present invention provides for a regenerable sulfur remover that comprises a gaseous flow 2, a first layer in line with the gaseous flow 6, and a second layer 8 in line with the first layer. The first layer comprises a physical absorber of sulfur; the second layer comprises a pyrophoric material capable of being reduced by the gaseous flow. To regenerate the adsorbing layer, a blower 22 blows air first over the second layer, the air flow is heated by passing over the second layer, and then over the first layer. The heated air flow removes sulfur from the first layer, and the air flow is exhausted after removing sulfur from the first layer.

12 Claims, 3 Drawing Sheets

SELF REGENERATING DESULFURIZER FOR GASEOUS FUELS

FIELD OF THE INVENTION

The field of the invention relates to fuel desulfurizers, and more particularly to a double layer bed system for the removal of sulfur from gaseous fuels.

BACKGROUND

Pipeline natural gas is the primary fuel of choice for distributed fuel cell-based power generation systems because of its abundant supply and well-developed infrastructure. By using a fuel processing system at the unit inlet to reform the methane and higher hydrocarbons in natural gas, both solid oxide fuel cells and molten carbonate fuel cells will convert chemical energy directly into electrical energy for power distribution. Although processing of natural gas to remove sulfur is usually carried out close to the point of extraction, the processing leaves residual hydrogen sulfide as a contaminant at low concentration (e.g. 1-2 $mg/m^3$). In addition to the naturally occurring hydrogen sulfide, pipeline natural gas usually contains other organic sulfur species that have been intentionally added as odorants.

The fuel reforming process requires heat, water vapor and a catalyst that enhances the chemical reaction rate. The most commonly used catalysts are nickel based. At the natural gas reforming temperature, the catalyst is highly susceptible to conversion into a metal sulfide if sulfur is present in the gas feed. This inactivates the catalyst and stops the reforming process. Therefore it is necessary to remove the sulfur from the gas flow to permit the desired fuel reforming to occur. In addition, sulfur that makes it through the reforming process will contribute to air pollution.

Advancement in the art of purifying materials has been made, such as with Kataoka, U.S. Pat. No. 6,828,141. However, this process is not regenerable, and does not have the specificity to sulfur as is needed. What is needed is a regenerable method and apparatus that can remove low levels of sulfur from a gaseous fuel flow.

Other difficulties with the prior art also exist, some of which will be apparent upon further reading.

SUMMARY OF THE INVENTION

With the foregoing in mind, methods and apparatuses consistent with the present invention, which inter alia facilitates the removal of sulfur from gaseous fuels. The present invention provides for a new type of desulfurizer for gaseous fuels. Sulfur needs to be removed from gaseous fuels. It is a natural contaminant found in natural gas, and can also be an added containment as part of the odorization process. However, sulfur is also very damaging to catalysts and other machinery parts, and causes reduction in performance. Process to remove the sulfur, however, requires maintenance since the desulfurizing capacity becomes spent.

The invention uses a double layer system. The first layer uses a regenerable sulfur absorber, such as zeolite. The second layer is a pyrophoric material. When the first layer adsorbs its capacity of sulfur, the desulfurizer is isolated and removed from service. To restore the sulfur adsorbing capacity of the adsorbent, air is blown backwards through the desulfurizer. As air passes over the pyrophoric material, it is heated. The heated air then provides the energy for physically adsorbed sulfur compounds to be released from the adsorbing surfaces and removes the sulfur from the sulfur absorber, regenerating it. When the system is in normal operation, the fuel stream reduces the pyrophoric material, in turn regenerating it.

These and other objects, features, and advantages in accordance with the present invention are provided particular embodiments by a regenerable sulfur remover that comprises a gaseous flow, a first layer in line with the gaseous flow, and a second layer in line with the first layer. The first layer comprises a physical absorber of sulfur; the second layer comprises a pyrophoric material capable of being reduced by the gaseous flow. During regeneration a blower blows air first over the second layer, the air flow is heated by passing over the second layer, and then over the first layer. Air, as used herein, refers to any oxidizing gas. The heated air flow removes sulfur from the first layer, and the air flow is exhausted after removing sulfur from the first layer. A purge clears the first layer and the second layer of the air flow.

In another embodiment the present invention provides for a regenerable sulfur remover for gaseous fuel flows that comprises a gaseous fuel flow, one or more pyrophoric layers, one or more desulfurizing layers, an air flow, an exhaust, and a purge. The exhaust and the purge may be the same line. The gaseous fuel flow passes over the pyrophoric material, transferring a portion of potential energy in the gaseous fuel flow to the pyrophoric layer. The gaseous fuel flow passes over the desulfurizing layer, sulfur is removed from the gaseous fuel flow, and to regenerate the desulfurizing layer, the air flow is passed over the pyrophoric layer heating the air flow and producing a heated air flow. The heated air flow is passed over the desulfurizing layer, removing sulfur from the desulfurizing layer. The heated air flow is exhausted after removing sulfur from the desulfurizing layer, and the purge purges the air flow and the heated air flow from the regenerable sulfur remover.

In still another embodiment the present invention provides for a method for removing sulfur from a gaseous fuel flow that comprises passing a gaseous fuel flow over one or more dual layer bed. The one or more dual layer comprises a desulfurizing portion and a pyrophoric portion, the desulfurizing portion removes sulfur from the gaseous fuel flow, and the pyrophoric portion stores a portion of energy from the gaseous fuel flow. Then determining a time to regenerate the desulfurizing portion of the one or more dual layer bed, and passing an air flow first over a substantial portion of the pyrophoric portion of the one or more dual layer bed, then over the desulfurizing portion. The air flow is heated by the pyrophoric portion, and the heated air flow removes sulfur from the desulfurizing portion to produce a sulfurous air flow. Then exhausting the sulfurous air flow, and purging the one or more dual layer bed of the air flow. In a related embodiment of the present invention the desulfurizing portion is a zeolite.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

Figure 1:
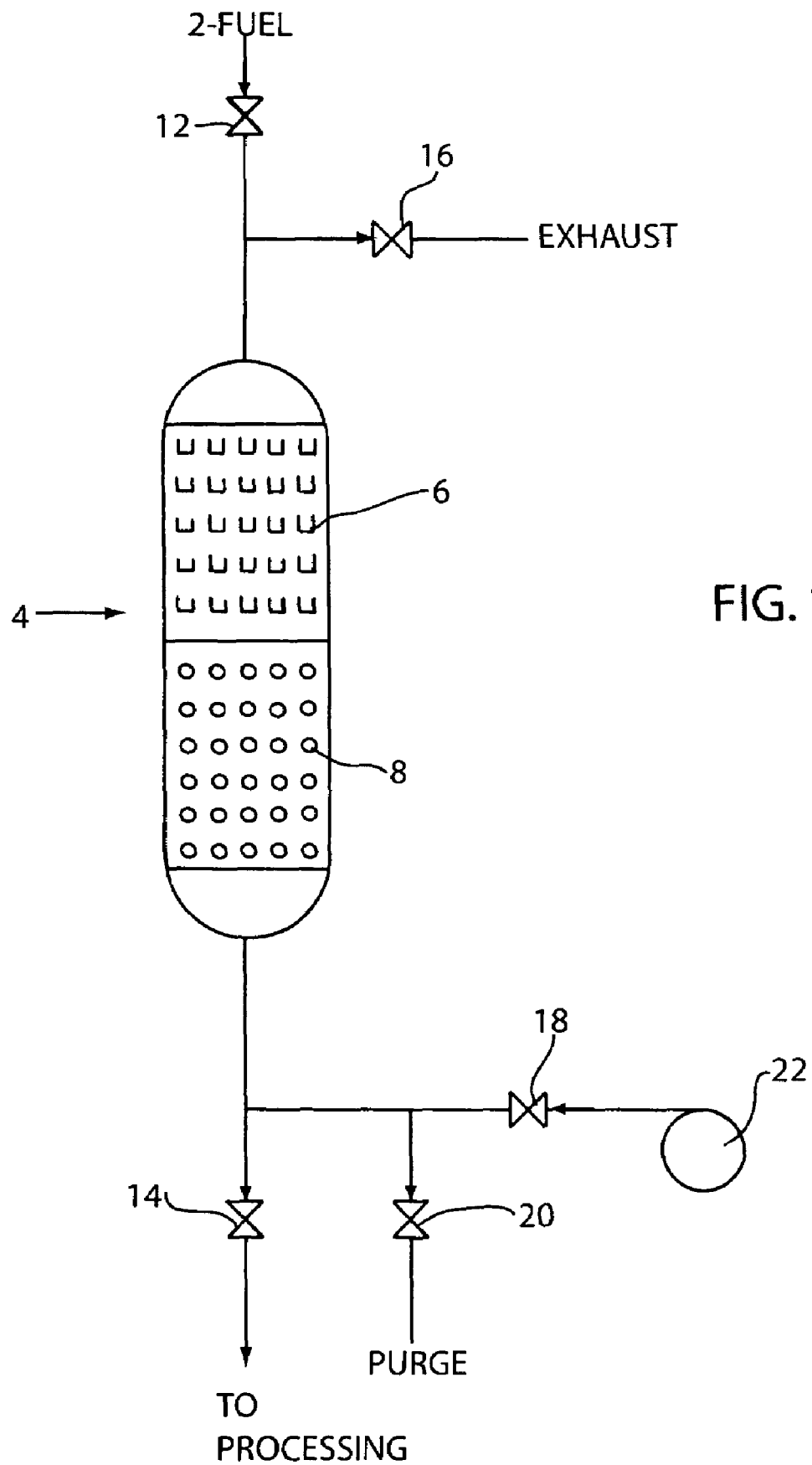
FIG. 1 illustrates an embodiment of the present invention with the regeneration air blowing in an opposite direction to the fuel flow.

The present invention provides for a regenerable two layer desulfurizer capable of removing even small amounts of sulfur from a gaseous fuel flow. Even small amounts of sulfur in a gaseous fuel flow can ruin sensitive catalysts and stop fuel reforming. The prior art sulfur removers generally require replacement and disposal of the adsorbing bed layer after it has become spent. If they are designed for in situ regeneration, an external source of regenerating heat is needed. In many cases this regenerating heat is provided in the form of steam. An advantage with the present invention is the elimination of the need for external equipment to remove and replace the spent bed or elimination of the external regeneration equipment and also the energy needed to supply heat. In addition, the time taken to replace or regenerate sulfur removers of the prior art leads to down time and added costs.

By using a fully regenerable two layer desulfurizer, a gaseous fuel can have most or all of its sulfur removed, with down times being few and limited. The present invention passes a fuel flow past a first layer composed of a regenerable sulfur adsorbing material that absorbs the sulfur, and then past a second layer of a pyrophoric material that can use some (small) amount of the heat in the flowing gas for a chemical reduction to store as potential energy. As will be discussed, the arrangements of these beds may be varied.

When the desulfurizing layer is in need of regeneration, an air flow is first passed over the pyrophoric material, which releases the potential energy and heats the air flow. The heated air flow then passes over the desulfurizing layer, heating it to sufficient temperatures so that the bound sulfur is then released into the air stream. This stream is vented until the desulfurizing layer is regenerated and/or the pyrophoric layer is exhausted. A purge is then passed through the system, venting the remaining air.

In a particular embodiment the sulfur adsorbent is a Zeolite material. Cation exchanged Zeolite-Y removes sulfur compounds by the process of physical adsorption. The sulfur containing molecules are not destroyed by the adsorption; they are attracted to the cation sites in the Zeolite by van der Waals forces, which are not as strong as covalent bonds and can be easily broken; therefore the adsorbent works better at room temperature or below. The adsorption can also work in both oxidizing and reducing environments.

Zeolite-Y materials, such as silver and copper exchanged Zeolite-Y have about 100-150 times the sulfur absorbing from hydrocarbon fuels as compared with prior art activated carbon. As a result of this, standard sized beds can be produced that will continuously absorb sulfur for months and even years.

To break the physical bonds of the adsorbed sulfur, heat may be applied. Passing a gas at about 300° C. over the Zeolite will remove the sulfur and regenerate the adsorbent. The sulfur will then be carried away in the gas flow. This heat is supplied by the pyrophoric material of the second layer.

The pyrophoric material is inert in regards to the normal operation of the gaseous fuel flow. But when oxidizing gas is passed over the pyrophoric material, such as air, it releases energy in the form of heat. Ideally the heat is released at a steady rate, bringing the air to temperatures that will release the sulfur from the absorbent, but not so high as to damage the absorbent material. For example, temperatures in the range of 300° C. are sufficient. The pyrophoric material may be made of materials known in the art, such as reduced iron, nickel, aluminum, copper, zinc and silver typically dispersed unto an inert, temperature resistant substrate such as alumina.

As discussed, the pyrophoric material is referred to as the material of the layer. In a particular embodiment, it is in fact a second layer, immediately after the first layer of absorbent material. In this embodiment, the air blown over the pyrophoric material will have to pass in an opposite direction to gas flow. However, in other embodiments, the second layer of pyrophoric material may be positioned before the first layer of adsorbent material. In such an embodiment, the regenerating air flow will pass in the same direction as the gaseous fuel flow.

In further abstraction, the second layer in some embodiments may even be combined with the first layer. If the two layers are homogeneously combined, then the adsorbent towards the start of the layer during the regeneration process may not receive enough heat to properly regenerate. Therefore, if the two layers are combined, a gradient combination will be preferred, where the pyrophoric material is heavier towards the end that begins the regeneration process.

FIG. 1 illustrates one embodiment of the present invention. In normal operation, fuel 2 is passed into the system and encounters the dual layer bed 4. In this arrangement, the fuel first passes over the desulfurizing layer 6 followed by the pyrophoric layer 8, and is then processed 10. While in normal operation, the standard operating valves 12, 14 are open and the regenerating valves 16, 18 and purge valve 20 are closed. When regeneration takes places, the regeneration valves 16, 18 are opened and the standard operating valves 12, 14 are closed. A blower 22 then pumps air backwards through the system.

As described, the air is heated to sufficiently high temperatures so that the sulfur bonded to the desulfurizing layer is removed and exhausted. Once this is complete the regenerating valves are closed and the fuel valve 12 and the purge valve 20 is opened so that the system can be purged of air before standard operation proceeds. Note the system may be purged in a variety of ways, such as fuel being added from the blower 22, in which case a separate purge valve would not be needed.

Figure 2:
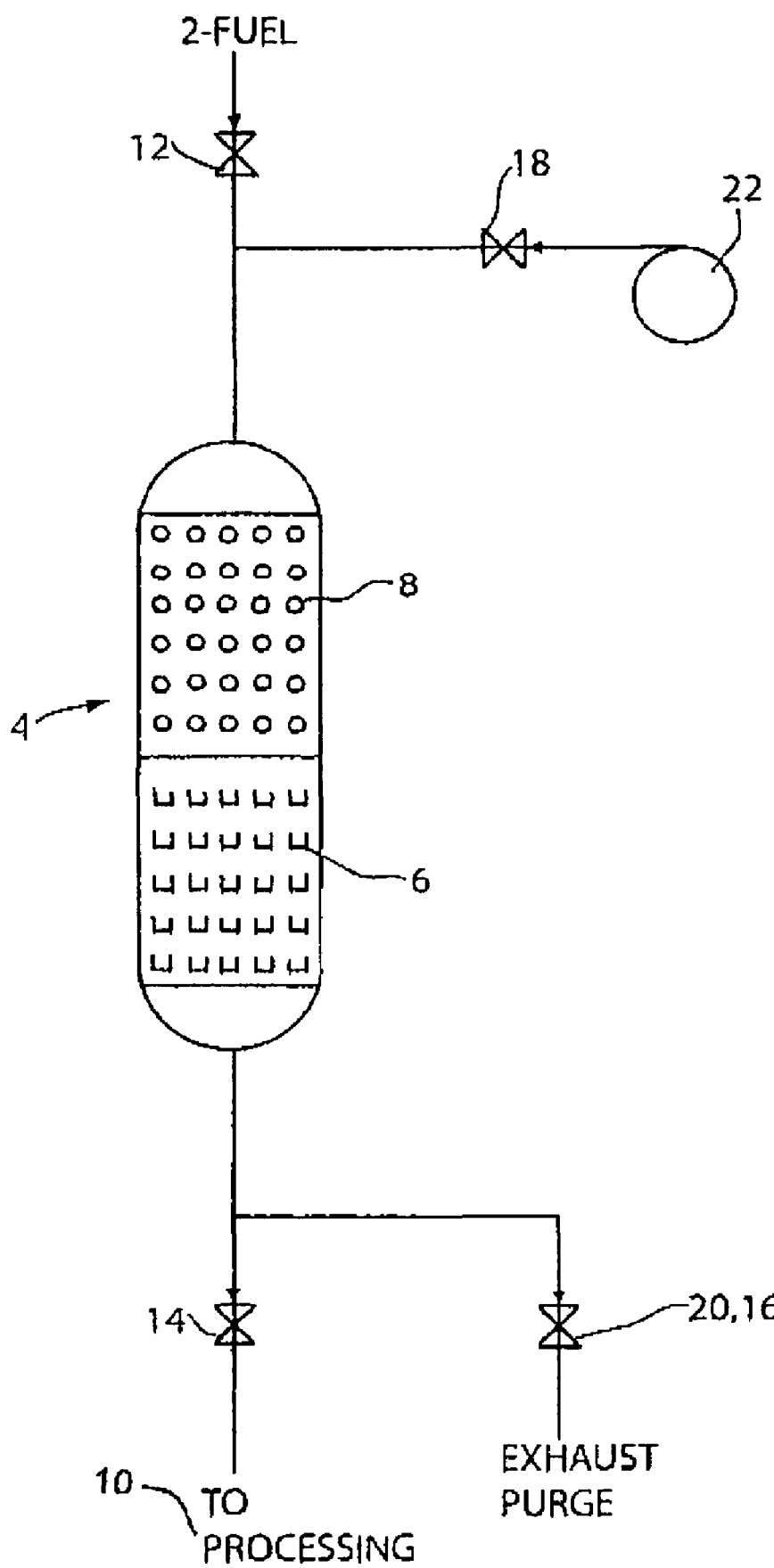
FIG. 2 illustrates an embodiment of the present invention with the regeneration blowing in the same direction as the fuel flow. In this embodiment the pyrophoric layer is on top of the adsorbing layer.

FIG. 2 illustrates an example of the layers being stacked in opposite sequence. In this embodiment the fuel 2 first passes through the pyrophoric material 8 and then the desulfurizing layer 6. The blower 22 this time enters the top of the dual layer 4 and is exhausted at the bottom. In this embodiment, the purge and exhaust is the same, so the purge/exhaust valve 16, 20 is used for both processes.

Illustrated here, the dual layers have distinctly defined regions. This, however, does not necessarily have to be the case. The layers may be somewhat mixed, as long as there is a gradient that greatly favors the pyrophoric material at the start of the regeneration. Without a substantial amount of pyrophoric material at the start of the regeneration, the air will not be heated to sufficient temperature to regenerate the desulfurizing material. Conversely, the two beds may actually be physically separated by some distance, although this may adversely affect keeping the air flow at high temperatures.

Figure 3:
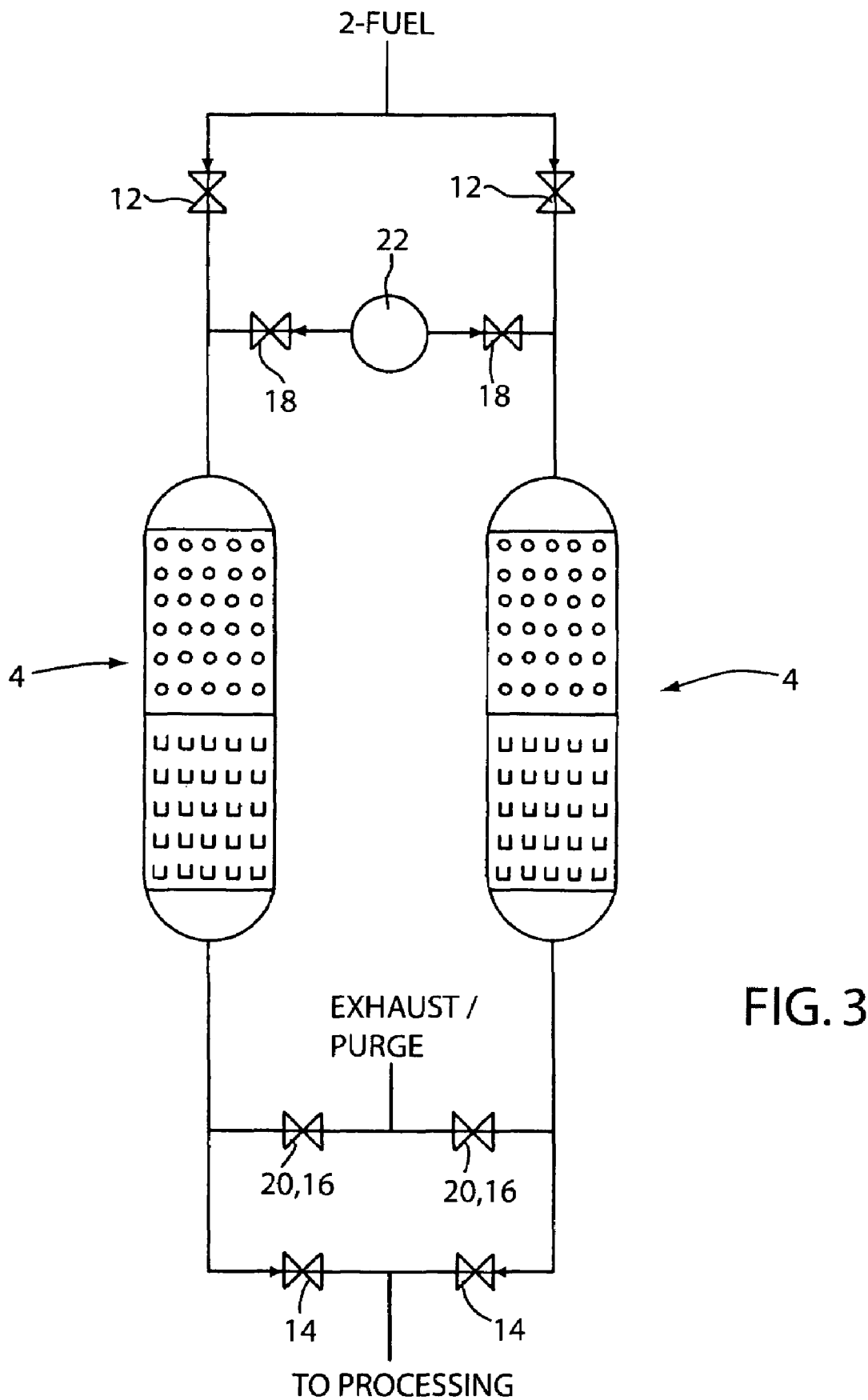
FIG. 3 illustrates two dual layer desulfurizer beds being operated in parallel according to one embodiment of the present invention.

Also as illustrated so far, only a single dual bed has been shown. However, in many embodiments multiple beds will be run in parallel. This has the added advantage of being able to regenerate one bed while still operating the other beds. FIG. 3 illustrates a simple example of two dual layer beds being run in parallel. By proper placement of the valves 12, 14, 16, 20, one dual layer bed 4 may be isolated from the other for regeneration, without interfering with the desulfurization of the other dual layer bed.

In one embodiment the present invention provides for a regenerable sulfur remover that comprises a gaseous flow, a first layer in line with the gaseous flow, and a second layer in line with the first layer. The first layer comprises a physical absorber of sulfur; the second layer comprises a pyrophoric material capable of being reduced by the gaseous flow. A blower blows air first over the second layer, the air flow is heated by passing over the second layer, and then over the first layer. Air, as used herein, refers to any oxidizing gas. The heated air flow removes sulfur from the first layer, and the air flow is exhausted after removing sulfur from the first layer. A purge clears the first layer and the second layer of the air flow.

In a related embodiment of the present invention the gaseous flow is a fuel. The physical absorber is zeolite or some other sulfur absorbent relying upon the process of physical adsorption to remove sulfur.

In another related embodiment the first layer is contacted by the gaseous flow before the second layer. The first layer is contacted by the gaseous flow after the second layer, and the air flow enters the regenerable sulfur remover on the same side as the gaseous flow.

In still another related embodiment of the present invention the exhaust and the purge are the same line. Also, one or more additional regenerable sulfur remover is run in parallel with the regenerable sulfur remover. The one or more additional regenerable sulfur remover may be regenerated while the regenerable sulfur remover continues to remove sulfur from the gaseous flow.

In a related embodiment of the present invention the pyrophoric material is chosen from the group consisting of reduced iron, nickel, aluminum, copper, zinc and silver. The air flow being heated to about 300° C.

In another embodiment the present invention provides for a regenerable sulfur remover for gaseous fuel flows that comprises a gaseous fuel flow, one or more pyrophoric layers, one or more desulfurizing layers, an air flow, an exhaust, and a purge. The exhaust and the purge may be the same line. The gaseous fuel flow passes over the pyrophoric material, transferring a portion of potential energy in the gaseous fuel flow to the pyrophoric layer. The gaseous fuel flow passes over the desulfurizing layer, sulfur is removed from the gaseous fuel flow, and to regenerate the desulfurizing layer, the air flow is passed over the pyrophoric layer heating the air flow and producing a heated air flow. The heated air flow is passed over the desulfurizing layer, removing sulfur from the desulfurizing layer. The heated air flow is exhausted after removing sulfur from the desulfurizing layer, and the purge purges the air flow and the heated air flow from the regenerable sulfur remover.

In still another embodiment the present invention provides for a method for removing sulfur from a gaseous fuel flow that comprises passing a gaseous fuel flow over one or more dual layer bed. The one or more dual layer comprises a desulfurizing portion and a pyrophoric portion, the desulfurizing portion removes sulfur from the gaseous fuel flow, and the pyrophoric portion stores a portion of energy from the gaseous fuel flow. Then determining a time to regenerate the desulfurizing portion of the one or more dual layer bed, and passing an air flow first over a substantial portion of the pyrophoric portion of the one or more dual layer bed, then over the desulfurizing portion. The air flow is heated by the pyrophoric portion, and the heated air flow removes sulfur form the desulfurizing portion to produce a sulfurous air flow. Then exhausting the sulfurous air flow, and purging the one or more dual layer bed of the air flow. In a related embodiment of the present invention the desulfurizing portion is a zeolite.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A system for regenerable sulfur removal comprising:
   a gaseous source for providing a gaseous flow in a first direction;
   a regenerable sulfur remover comprising a first layer in line with said gaseous flow and a second layer in line with said first layer, wherein said first layer comprises a physical absorber of sulfur, wherein said physical absorber is effective to absorb sulfur from said gaseous flow when said gaseous flow is passed over said first layer, and wherein said second layer comprises a pyrophoric material;
   a blower configured to feed an unheated air flow first over said second layer and then over said first layer;
   wherein said pyrophoric material of said second layer is effective to heat said unheated air flow when said unheated air flow is passed over said pyrophoric material of said second layer to provide a heated air flow; and
   wherein said heated air flow is effective to remove absorbed sulfur from said first layer when said heated air flow is passed over said first layer; and
   an exhaust configured to remove said heated air flow after said air heated flow is passed over said first layer.

2. The system for regenerable sulfur removal of claim 1, wherein said gaseous flow is a fuel.

3. The system for regenerable sulfur removal of claim 1, wherein said physical absorber is zeolite.

4. The system for regenerable sulfur removal of claim 1, wherein said first layer is a distinct layer from said second layer, and wherein said first layer is disposed upstream from said second layer.

5. The system for regenerable sulfur removal of claim 1, wherein said first layer is a distinct layer from said second layer, and wherein said first layer is disposed downstream from said second layer.

6. The system for regenerable sulfur removal of claim 5, wherein said blower and said gaseous source are each configured to provide said gaseous flow and said air flow in said first direction.

7. The system for regenerable sulfur removal of claim 1, further comprising at least one additional regenerable sulfur remover configured in parallel with said regenerable sulfur remover.

8. The system for regenerable sulfur removal of claim 7, wherein said blower is configured to blow air over a second layer and then a first layer of said at least one additional regenerable sulfur remover while said gas source of said regenerable sulfur remover is configured to provide said gaseous flow in the first direction over said first layer of said regenerable sulfur remover.

9. The system for regenerable sulfur removal of claim 1, wherein said pyrophoric material is a reduced metal chosen from the group consisting of iron, nickel, aluminum, copper, zinc and silver.

10. The system for regenerable sulfur removal of claim 1, wherein said second layer is configured to heat said air flow when passed thereover to about 300° C.

11. The system for regenerable sulfur removal of claim 1, wherein said first layer and said second layer are combined into a single layer comprising a non-homogeneous mixture of the physical absorber of sulfur and the pyrophoric material, and wherein said pyrophoric material is in greater concentration toward an end closest to an inlet air flow from said blower.

12. The system for regenerable sulfur removal of claim 1, wherein said first layer is spaced apart from said second layer.

* * * * *